United States Patent [19]

Grice

[11] Patent Number: 4,465,719

[45] Date of Patent: Aug. 14, 1984

[54] LIGHTWEIGHT CONCRETE AND STRUCTURAL ELEMENT INCORPORATING SAME

[76] Inventor: Harold E. Grice, 120 Abbott St., Salinas, Calif. 93901

[21] Appl. No.: 392,489

[22] Filed: Jun. 28, 1982

Related U.S. Application Data

[62] Division of Ser. No. 137,340, Apr. 4, 1980, Pat. No. 4,351,670.

[51] Int. Cl.³ .................... B32B 5/16; B32B 13/00
[52] U.S. Cl. ................................. 428/70; 428/404; 428/703
[58] Field of Search ............... 428/70, 71, 703, 402, 428/404, 323, 331, 446, 307.3, 307.7, 312.4, 312.6

[56] References Cited

U.S. PATENT DOCUMENTS

| | | | |
|---|---|---|---|
| 2,081,802 | 5/1937 | Eklund | 106/87 |
| 3,192,060 | 6/1965 | Tilsen | 106/97 |
| 3,239,472 | 3/1966 | De Lisle | 106/97 |
| 3,691,003 | 9/1972 | Elischer | 428/703 |
| 3,867,159 | 2/1975 | Ergene | 106/88 |
| 3,870,553 | 3/1975 | Hussey | 428/703 |
| 4,053,677 | 10/1977 | Corao | 428/703 |
| 4,203,788 | 5/1980 | Clear | 428/703 |

FOREIGN PATENT DOCUMENTS 1930198 12/1970 Fed. Rep. of Germany ...... 428/402

Primary Examiner—William J. Van Balen
Attorney, Agent, or Firm—Townsend and Townsend

[57] ABSTRACT

A low density non-shrinking concrete possessed of high strength and favorable insulation properties. The concrete manufacturing process includes the steps of providing a body of cured cellular concrete, breaking the body into fragments, coating the cellular concrete fragments with a thin layer of cement which is allowed to cure, and incorporating the coated fragments in a cement matrix to form the low density concrete. The cellular concrete fragments are preferably tumbled to remove sharp corners prior to the coating operation. The tumbling and coating operations are preferably carried out on fragments that have been classified into groups of related sizes. The concrete in the ultimate mix avoids the shrinkage problems normally associated with cellular concrete, and is therefore suitable for use in cast building slabs and panels or as the core material in composite building elements.

5 Claims, 6 Drawing Figures

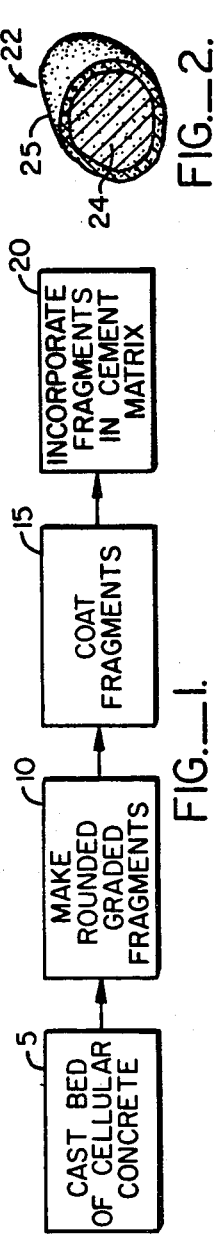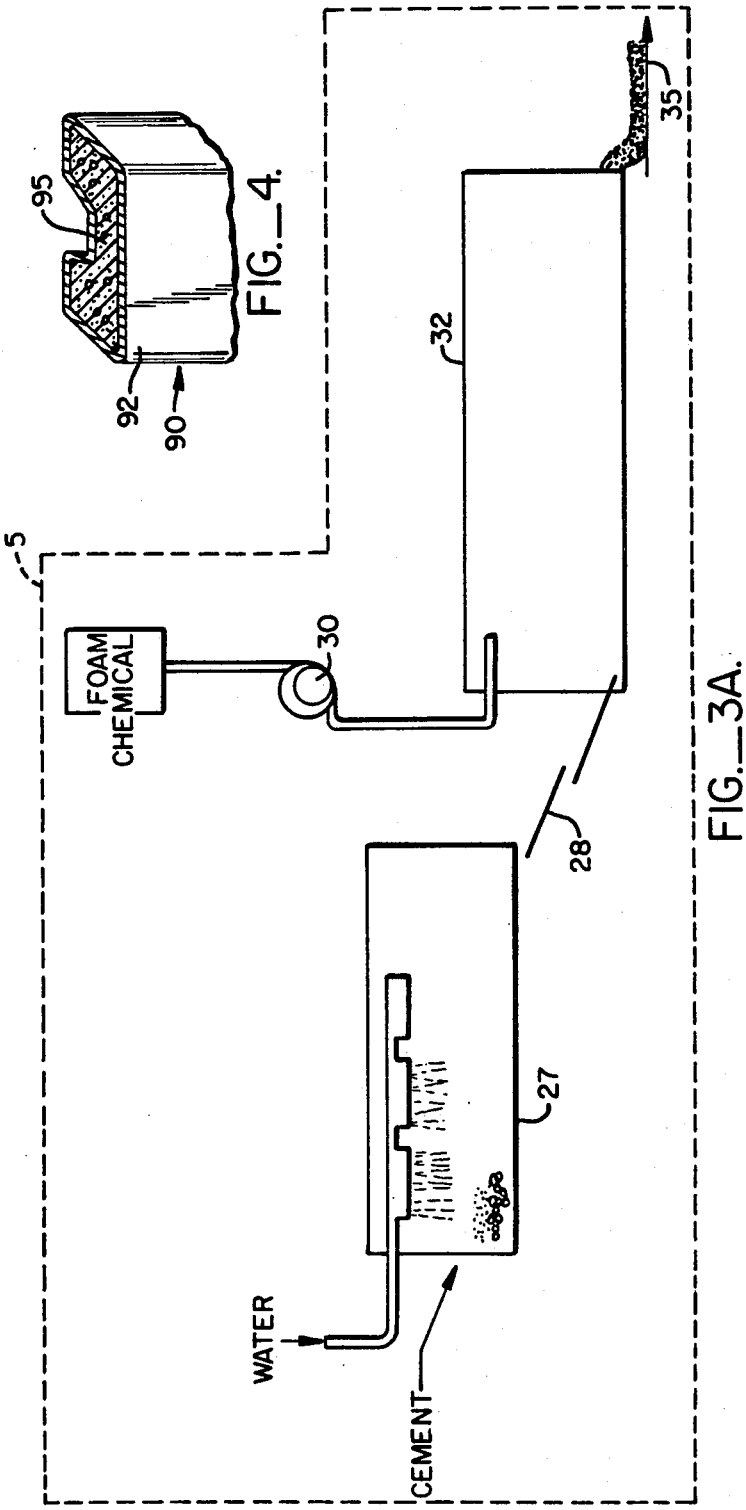

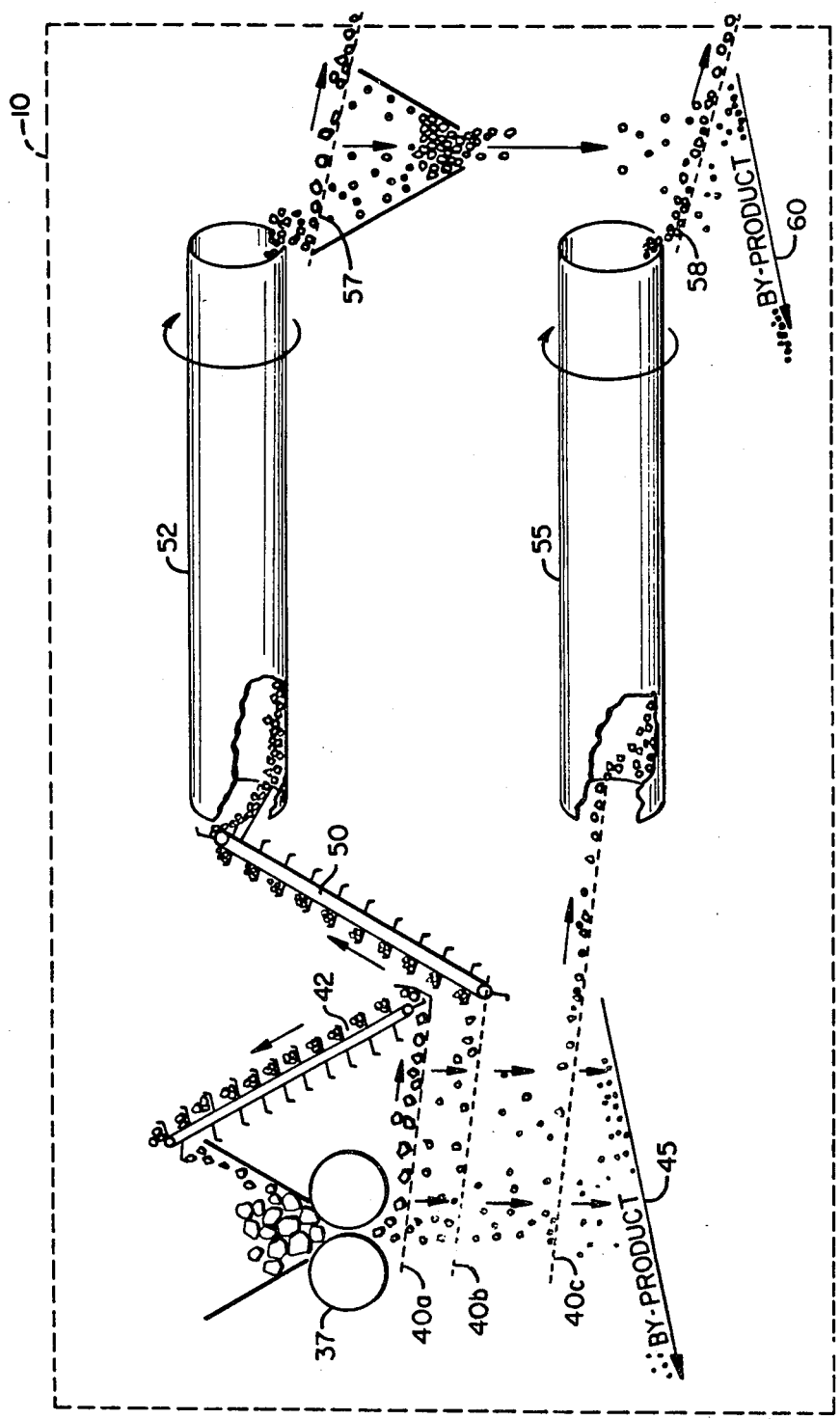
FIG._3B.

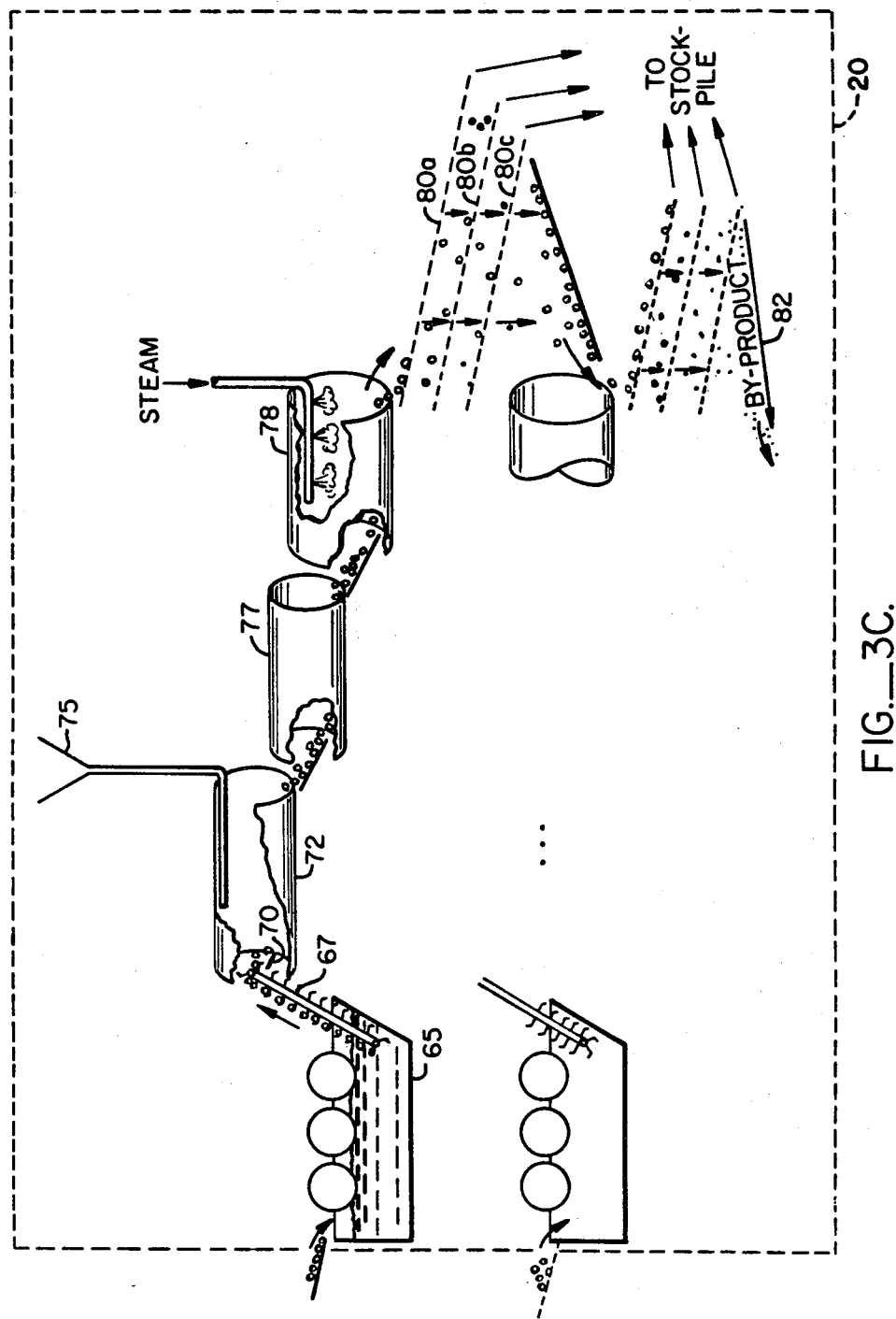
FIG._3C.

LIGHTWEIGHT CONCRETE AND STRUCTURAL ELEMENT INCORPORATING SAME

This is a division of application Ser. No. 137,340 filed Apr. 4, 1980 now U.S. Pat. No. 4,351,670, issued Sept. 28, 1982.

FIELD OF THE INVENTION

The present invention relates generally to concrete and more specifically to a method for making a lightweight concrete having sufficient strength for use in structural elements.

BACKGROUND OF THE INVENTION

Concrete is a well-known, highly versatile building material comprising cement, aggregate, and water. The mixture is initially prepared in an aqueous slurry that is then allowed to cure in a mold or form. The cement, upon hydration, binds the aggregate in a hardened matrix having considerable compressive strength. Tensile strength may be achieved by embedding steel reinforcement bars in the concrete. Typically, the aggregate includes a gradation of particle sizes to minimize the amount of cement required. The particular size proportions are dictated by geometric considerations and may be specified in construction materials specifications and the like.

There are many building applications where relatively low density concrete is a suitable or useful material. Low density concrete has the advantages of light weight and favorable insulation properties, although it lacks the full strength of normal concrete.

Generally there are two ways to achieve a low density concrete. The first way is to use a low density aggregate such as pumice or other lightweight rock. However, the use of lightweight aggregate material is not always feasible, since it is generally unavailable in many locations where lightweight concrete may be required. The second way of making low density concrete is to add foam to the concrete mix. The foam introduces small air bubbles into the slurry so that when the concrete cures, the air bubbles remain trapped therein, thus providing a so-called "cellular concrete" having a decreased overall density. The use of cellular concrete overcomes the supply problem associated with the use of volcanic aggregates, and further allows an increased degree of control over the density of the finished product. However, cellular concrete typically suffers from prohibitive shrinkage and cracking during the curing operation. Accordingly, cellular concrete has found use in floor fill and roof deck applications, providing insulation and a degree of fire protection, but due to the shrinkage and cracking, it is generally unsuitable for use as a structural material.

SUMMARY OF THE INVENTION

The present invention provides a low density non-shrinking concrete possessed of high strength and favorable insulation properties, and which is readily made without regard to the availability of specialized aggregates.

Broadly, the concrete manufacturing process according to the present invention involves the steps of providing a body of cured cellular concrete, crushing the body to produce fragments of the cellular concrete material, coating the cellular concrete fragments with a thin layer of cement which is allowed to cure, and then using the coated fragments instead of, or in addition to, natural aggregates in a cement matrix to form the low density concrete of the present invention.

The cellular concrete fragments are preferably tumbled prior to the coating operation to remove sharp corners and render the fragments generally rounded. Moreover, the fragments may be classified by size prior to the tumbling operation and also after the tumbling operation so that the coating operation is carried out on fragments of related sizes. The coated fragments are also preferably classified by size so that the ultimate concrete mixture can utilize coated fragments having a desired size distribution. The coating operation may be carried out either by wetting the rounded cellular concrete fragments and tumbling them in the presence of airborne cement powder, or by passing the rounded cellular concrete fragments through a thin slurry of cement.

The cement coating serves a number of very important functions. First, it seals the porous cellular concrete which defines the core of the coated fragments so that on subsequent incorporation into the ultimate concrete mix, the porous core does not draw the water out of the slurry and thus interfere with the setting of the cement. At the same time, the cement in the ultimate mix can readily adhere to the cement coating. Additionally, depending on thickness, the cured cement skin on the outside of the rounded cellular concrete core provides a skin having considerable strength. This is especially true in view of the fact that the cellular concrete fragment has been tumbled so that it is generally round, the lack of sharp corners eliminating points of stress concentration. The cement skin provides strength in the manner of an eggshell. The skin strength protects the rounded fragments from crumbling during stockpiling and subsequent mixing operations, and provides a hard wearing surface in the finished concrete product.

The concrete of the present invention has the important advantage that it is generally free from the shrinkage problems normally associated with cellular concrete. In particular, all the shrinkage occurs during the initial curing of the cellular concrete. Cracking typically occurs, but is of no consequence since the cured cellular concrete is subsequently crushed. Since the ultimate concrete is non-shrinking, it may be incorporated into structural elements such as cast slabs and panels, or it may be used as core material in composite beams having an outer metal shell. Such usage is highly desirable where lumber is, for one reason or another, unavailable.

The rounded cellular concrete fragments may be incorporated into the ultimate concrete mix without coating them, but special steps have to be taken to ensure a proper cure. In particular, extra water would have to be added to the concrete to compensate for the water drawn out of the mix into the cellular concrete fragments. Alternately, the uncoated fragments could be pre-soaked so that they do not draw in any water from the mix. However, these alternates to coating tend to degrade the insulative properties of the material since cement is carried into the pores. Moreover, since the uncoated fragments would absorb water at a variable rate, the mix would likely show variations between the time it was mixed and the time the cement cured. The coated fragments, on the other hand, provide a substantially stable mix which does not depend critically on the timing after mixing.

It should also be realized that the rounded cellular concrete fragments provide a useful insulation material for wall fill applications and the like. The material has the insect-resistant and fire-resistant properties of cellular concrete generally, but is a dry material that is often more convenient to use than pouring wet cellular concrete. The fragments are preferably rounded to avoid crumbling and coated to prevent moisture absorption, although the coating need not be cement. Since there is no need for the skin to stick to cement (as in a concrete mix), any convenient coating, even paint, is suitable.

For a further understanding of the nature and advantages of the present invention, reference should be made to the remaining portions of the specification and the attached drawings.

BRIEF DESCRIPTION OF THE DRAWINGS

FIG. 1 is a block diagram showing the main operations involved in making low density concrete according to the present invention;

FIG. 2 is a sectioned perspective view of a coated, rounded fragment according to the present invention;

FIGS. 3A–3C, taken together, form a schematic flow sheet illustrating in greater detail the operations blocked out in FIG. 1; and FIG. 4 is a sectioned isometric view of a composite structural element utilizing the low density concrete of the present invention.

DETAILED DESCRIPTION OF THE INVENTION

FIG. 1 is a block diagram showing the main operations involved in making lightweight concrete having considerable structural strength. Block 5 shows the operation of providing a body of cured cellular concrete material; block 10 shows the operation of transforming the cured body of cellular concrete into rounded fragments of graded size; block 15 shows the operation of coating the rounded fragments of cellular concrete with a thin cement skin; and block 20 shows the operation of incorporating the coated fragments into a concrete mix for use as a structural building material.

The result of operations 5, 10, and 15 is a fabricated aggregate material, the individual constituents of which have a structure as best seen in FIG. 2. In particular, an article 22 comprises a rounded cellular concrete core 24 which is covered with a cured cement skin 25. The overall cross-sectional dimensions of article 22 are generally in a range of 2–25 mm, with cement skin 25 having a thickness generally less than approximately ½ mm. Operations 5, 10, 15 and 20 will now be considered in detail.

Operation 5 of providing a body of cellular concrete is illustrated in FIG. 3A and is carried out as follows. A slurry of cement (such as Portland cement) and water is mixed in a concrete mixer 27 to produce a homogenous mix. The cement slurry is transported through a conduit 28 and combined with a stable foam from a foam generator 30 in a second mixer 32 in order to make a cellular concrete mix. Cellular concrete is well known in the art, and there are many manufacturers of chemicals and systems. A particular manufacturer is Waukesha Foundry, a division of Abex Corporation, 1300 Lincoln, Waukesha, Wis. 53816, marketing its system under the registered trademark "Cellufoam". The proportions of materials will of course vary depending on the application, but a representative mixture is shown in Table 1 as follows:

TABLE 1

| Material | Amount |
|---|---|
| Cement | 685 lb |
| Water | 40 gal |
| Foam | 18 ft$^3$ |

The cellular concrete slurry is then deposited over a large area and allowed to cure to form a body or bed 35 of cured cellular concrete. During the curing, a considerable degree of shrinkage occurs, but the present invention avoids any problems associated with this shrinkage. The dry density of the cured cellular concrete may be controlled by the proportions of foam added, but is typically in the range of 30–40 lb/ft$^3$ (0.48–0.64 gm/cm$^3$).

Operation 10 of transforming cellular concrete body 35 into rounded, graded fragments is illustrated in FIG. 3B, and is carried out as follows. Body 35 is broken into manageable chunks by any convenient means such as a bulldozer or backhoe, and the chunks are fed through a crusher 37 to produce fragments. The output of crusher 37 is passed through a series of sieves such as a ¾" inch (19.05 mm) sieve 40a, a #3 (6.35 mm) sieve 40b, and a #8 (2.38 mm) sieve 40c. Particles that do not pass ¾" sieve 40 are transported on a conveyor 42 back to the input of crusher 37 for recrushing. Fragments passing #8 seive 40c are transported away on a conveyor 45 as "by-product" (to be described below). Thus it can be seen that sieves 40a–c have effectively classified the crushed material into two size ranges.

The larger fragments, generally having transverse dimensions in the range of ¼"-¾" (6.35–19.05 mm) are carried on a conveyor 50 to a first rounding tumbler 52, while fragments in the smaller size range (2.38 mm–6.35 mm) are fed to a second tumbler 55. The fragments in respective tumblers are tumbled to remove sharp edges and corners and render the fragments generally rounded in configuration so that their shapes generally resemble the shapes of smooth pebbles (although having a foam-like surface). The rounded fragments from first tumbler 52 are deposited on a #3 sieve 57, while the rounded fragments from tumbler 55 are deposited on a #8 sieve 58. Fragments passing through #3 sieve 57 are deposited on #8 sieve 58, the fragments passing through #8 sieve 58 being carried away on a conveyor 60 as by-product. The particular dimensions of the sieve openings for sieves 40a–c, 57, and 58 are not critical, but are merely to separate the crushed material into related size ranges that will not interfere with complete rounding or be detrimental to the smallest fragments.

Coating operation 20 in which a thin cement skin is applied to the rounded fragments is illustrated in FIG. 3C and is carried as follows. The coating operation is carried out separately on the two size groupings of fragments, at whatever time scale is appropriate for the throughput requirements. The apparatus for coating the larger group of rounded fragments is shown, it being understood that similar apparatus may be used to coat the smaller fragments at the same time, or the same coating apparatus may be used to coat the two groups on an alternating basis. The rounded particles are passed through a tank 65 containing water or a thin cement slurry to wet the fragments and saturate the pores and internal structure. The wetted fragments are then carried on a conveyor 67 and deposited on a screen 70 which removes excess water. The wet particles are then passed through a coating tumbler 72 which keeps the particles from adhering to one another. Cement powder from a hopper is introduced into the atmosphere within tumbler 72, the cement being dispersed as a fine dust that deposits an even coating on all the particles.

The decision as to coating thickness involves, to some extent, a tradeoff. If a thin cement slurry alone is used for coating (no dusting), a thinner coating results. This has the possible advantage that the surface is more irregular so that the cement in the ultimate concrete mix can adhere better. However, the slurry coating possesses less strength than the thicker skin arising from dusting, and may be less effective to seal out water.

Once coated, the particles are passed from dusting tumbler 72 to a drying tumbler 77 where they are tumbled during initial drying to pack the cement power tightly and keep the particles separated while this cement coating is curing. A quick curing cement is desirable for this portion of the operation. The particles may then be passed through an optional steam curing tumbler 80 where they are tumbled in the presence of steam to accelerate the curing. After the cement skin has cured, the coated fragments are deposited on a series of sieves 80a, 80b, 80c in order to separate the coated rounded fragments into separate sizes for stockpiling. A certain portion of the material passes a #8 sieve and is transported away on a conveyor 82 as by-product.

Mixing operation 20 is not illustrated, being a standard concrete mixing operation. Depending on throughput needs, either of mixers 27 or 32, if available, may be used. The coated fabricated aggregate material (as shown in FIG. 2) is incorporated into a concrete mixture with the coated aggregate being used as a substitute for the larger natural aggregate that would normally be in the mix. A representative mixture is shown in Table 2 as follows.

TABLE 2

| Material | Size | Quantity |
|---|---|---|
| Coated aggregate | ¾"-½" | 450 ml |
| Coated aggregate | ½"-⅜" | 300 ml |
| Coated aggregate | ⅜"-#3 | 150 ml |
| Coated aggregate | #3-#4 | 150 ml |
| Coated aggregate | #4-#8 | 200 ml |
| Sand | #8-#16 | 200 ml |
| Sand | #16-#30 | 200 ml |
| Sand | #30-#50 | 150 ml |
| Sand | #50-#100 | 100 ml |
| Sand | #100-#200 | 20 ml |
| Cement | — | 585 gm |

When the concrete cures, the amount of shrinkage is no greater than that associated with normal concrete, since all the shrinkage normally associated with cellular concrete occurred prior to the crushing step.

The lightweight concrete mixture formulated according to the proportions and materials shown in Table 2 was cast in a cylindrical form having a length twice the diameter, and was found after 7 days of curing to have a compression strength of 1039 psi, which is expected to be approximately 60% of the strength after a 28 day cure.

FIG. 4 is a sectioned isometric view illustrating the use of the improved low density concrete in a composite building element 90. In particular, structural element 90 comprises a tubular metal shell 92 having a desired outside configuration, and being filled with a core 95 of concrete. The concrete is poured into sheel 92 and allowed to cure therein. Since the shrinkage is low, the proper dimensional relationships are preserved and the structural integrity is maintained. The improved concrete may also be used to cast floor slabs and wall panels that combine structural strength with favorable insulation properties.

The by-product material that passed through a #8 sieve at various points in the process may be used as a mortar by mixing three parts by-product and one part cement with an appropriate amount of water, or may be incorporated into a mixture which may be cast into nailable board. A representative mixture for such board is shown in Table 3 as follows.

TABLE 2

| Material | Size | Proportion (By Volume) |
|---|---|---|
| Coated aggregate | #4-#8 | 2 parts |
| By-product | — | 3 parts |
| Cement | — | 1 part |

In summary it can be seen that the present invention provides an improved low density concrete product and method. The reliance on specialized aggregate material is eliminated, the ultimate concrete mix only requiring sand in addition to the cement and fabricated aggregate material. Objectionable shrinkage and cracking do not pose any problem, and in fact facilitate the operation by breaking up somewhat cured cellular concrete bed 35.

While the above provides a full and complete disclosure of the preferred embodiment of the invention, various modifications, alternate constructions, and equivalents may be employed without departing from the true spirit and scope of the invention. For example, the proportions of materials disclosed are representative, but particular applications may require departure therefrom. Moreover, while all the material at each stage of the process (except for by-product) is shown as being used in subsequent stages, it should be understood that various amounts of material of different sizes could be diverted for fill and other uses rather than as part of the low density concrete mix. Therefore, the above description and illustrations should not be construed as limiting the scope of the invention, which is defined by the appended claims.

I claim:

1. A composite structural element comprising:
   a tubular shell of tensile material; and
   a body of concrete material filling said tubular shell, said concrete material comprising
   a cured cementitious matrix and a plurality of fabricated aggregate particles embedded therein, each of said particles comprising a core of cured cellular concrete of a type whose curing is accompanied by substantial shrinkage and a coating of cured cement, said cementitious matrix being of a material whose curing is accompanied by minimal shrinkage.

2. The invention of claim 1 wherein said tensile material is metal.

3. A composite structural element comprising:
   a tubular shell of tensile material; and
   a body of concrete material filling said tubular shell, said concrete material comprising a plurality of rounded fragments of cured cellular concrete incorporated in a cementitious matrix, said cellular concrete being of a type whose curing is accompanied by substantial shrinkage, said cementitious matrix being of a cementitious material whose curing is accompanied by minimal shrinkage.

4. The invention of claim 3 wherein each of said rounded fragments has a coating of cured cement deposited prior to incorporation into said cementitious matrix.

5. The invention of claim 3 wherein said tensile material is metal.

* * * * *